(12) United States Patent
Adrangi et al.

(10) Patent No.: US 7,535,878 B2
(45) Date of Patent: May 19, 2009

(54) METHOD, APPARATUS AND SYSTEM FOR ENSURING RELIABLE ACCESS TO A ROAMING MOBILE NODE

(75) Inventors: Farid Adrangi, Lake Oswego, OR (US); Ranjit S Narjala, Hillsboro, OR (US); Mike Andrews, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 10/401,896

(22) Filed: Mar. 28, 2003

(65) Prior Publication Data

US 2004/0190534 A1  Sep. 30, 2004

(51) Int. Cl.
*H04W 4/00* (2006.01)

(52) U.S. Cl. .................. 370/338; 370/331; 370/252; 455/432.1; 455/435.1

(58) Field of Classification Search .............. 370/310.2, 370/328, 331, 389, 400, 252, 338; 455/432.1, 455/433, 435.1, 455
See application file for complete search history.

(56) References Cited

U.S. PATENT DOCUMENTS

| | | | |
|---|---|---|---|
| 6,160,804 A * | 12/2000 | Ahmed et al. ............... | 370/349 |
| 6,168,513 B1 | 1/2001 | Souza et al. | |
| 6,321,090 B1 | 11/2001 | Soliman | |
| 6,366,961 B1 | 4/2002 | Subbiah et al. | |
| 6,400,722 B1 | 6/2002 | Chuah et al. | |
| 6,421,714 B1 | 7/2002 | Rai et al. | |
| 6,430,698 B1 | 8/2002 | Khalil et al. | |
| 6,445,922 B1 | 9/2002 | Hiller et al. | |
| 6,496,704 B2 | 12/2002 | Yuan | |
| 6,510,153 B1 | 1/2003 | Inoue et al. | |
| 6,535,493 B1 | 3/2003 | Lee et al. | |
| 6,567,664 B1 | 5/2003 | Bergenwall et al. | |

(Continued)

FOREIGN PATENT DOCUMENTS

EP    1284559 A2    2/2003

(Continued)

OTHER PUBLICATIONS

PCT International Search Report (dated Jul. 19, 2004), International Application No. PCT/US2004/006041, International Filing Date Feb. 26, 2004 (12 pgs.).

(Continued)

*Primary Examiner*—Firmin Backer
*Assistant Examiner*—Nguyen Ngo
(74) *Attorney, Agent, or Firm*—Sharmini N. Green

(57) ABSTRACT

A method, apparatus and system provide reliable access to a mobile node. Requests for care of addresses (COAs) are intercepted and the mobile node hostnames in the requests are replaced with alternative configured names. These altered requests are then passed down the network stack. Similarly, replies to the COA requests are also intercepted and the alternative configured names may be replaced with the mobile node hostnames. These replies may then be passed up the network stack. A mobile IP registration request extension may be used to create a mapping entry in a Domain Name Services (DNS) server between the mobile node hostname and the mobile node home address. This mapping entry ensures that the mobile node is consistently reachable via its hostname.

16 Claims, 5 Drawing Sheets

U.S. PATENT DOCUMENTS

| | | | |
|---|---|---|---|
| 6,571,289 B1 | 5/2003 | Montenegro | |
| 6,614,774 B1* | 9/2003 | Wang | 370/338 |
| 6,621,810 B1 | 9/2003 | Leung | |
| 6,636,498 B1 | 10/2003 | Leung | |
| 6,690,659 B1* | 2/2004 | Ahmed et al. | 370/328 |
| 6,795,701 B1* | 9/2004 | Baker et al. | 455/411 |
| 6,829,480 B1 | 12/2004 | Hoglund et al. | |
| 6,856,624 B2 | 2/2005 | Magret | |
| 6,904,466 B1* | 6/2005 | Ishiyama et al. | 709/245 |
| 6,934,274 B2 | 8/2005 | Inoue et al. | |
| 6,970,943 B1 | 11/2005 | Subramanian et al. | |
| 6,973,057 B1 | 12/2005 | Forslow | |
| 6,988,146 B1 | 1/2006 | Magret et al. | |
| 6,999,437 B2* | 2/2006 | Krishnamurthi et al. | 370/331 |
| 7,020,120 B2 | 3/2006 | Inoue et al. | |
| 7,047,561 B1 | 5/2006 | Lee | |
| 7,058,728 B1 | 6/2006 | Eklund | |
| 7,079,499 B1 | 7/2006 | Akhtar et al. | |
| 7,079,520 B2* | 7/2006 | Feige et al. | 370/338 |
| 7,082,476 B1* | 7/2006 | Cohen et al. | 709/246 |
| 7,096,273 B1 | 8/2006 | Meier | |
| 7,107,620 B2 | 9/2006 | Haverinen et al. | |
| 7,116,654 B2* | 10/2006 | Kim | 370/338 |
| 7,120,131 B2 | 10/2006 | Seppala et al. | |
| 7,130,629 B1 | 10/2006 | Leung et al. | |
| 7,149,219 B2 | 12/2006 | Donahue | |
| 7,243,141 B2 | 7/2007 | Harris | |
| 2002/0007414 A1 | 1/2002 | Inoue et al. | |
| 2002/0022486 A1* | 2/2002 | Chen | 455/452 |
| 2002/0059452 A1* | 5/2002 | Yokota et al. | 709/238 |
| 2003/0142650 A1* | 7/2003 | Fan | 370/338 |
| 2003/0224788 A1 | 12/2003 | Leung et al. | |
| 2003/0224855 A1 | 12/2003 | Cunningham | |
| 2004/0037260 A1 | 2/2004 | Kakemizu et al. | |
| 2004/0047348 A1* | 3/2004 | O'Neill | 370/389 |
| 2004/0090942 A1* | 5/2004 | Flinck | 370/338 |
| 2004/0137888 A1* | 7/2004 | Ohki | 455/417 |
| 2004/0203765 A1 | 10/2004 | Das et al. | |
| 2004/0264414 A1 | 12/2004 | Dorenbosch | |
| 2005/0009520 A1 | 1/2005 | Herrero et al. | |
| 2005/0265363 A1 | 12/2005 | Chen | |
| 2006/0013170 A1* | 1/2006 | Shin et al. | 370/338 |
| 2006/0018296 A1 | 1/2006 | Muraoka et al. | |
| 2006/0111102 A1* | 5/2006 | O'Neill | 455/432.1 |
| 2006/0126659 A1 | 6/2006 | Baum et al. | |
| 2006/0190586 A1 | 8/2006 | Stewart et al. | |
| 2007/0025366 A1* | 2/2007 | Shahrier et al. | 370/400 |
| 2007/0058642 A1 | 3/2007 | Eisink | |

FOREIGN PATENT DOCUMENTS

| | | |
|---|---|---|
| GB | 2366483 | 3/2002 |
| JP | 10013712 | 1/1998 |
| KR | 200315502 A | 2/2003 |
| WO | WO 02/32159 A2 | 4/2002 |

OTHER PUBLICATIONS

Yu Chen, et al. "Dynamic Home Agent Reassignment in Mobile IP", WCNC. IEEE Wireless Communications and Networking Conference, vol. 1, Mar. 17, 2002 pp. 44-48, XP000864173.

Rong Zheng, et al., "A Case for Mobility Support With Temporary Home Agents", IEEE Publications, Oct. 15, 2001, pp. 226-233, XP010562099.

Alex C. Snoeren, et al., "An End-to-End Approach to Host Mobility", MobiCom 2000, Aug. 2000, pp. 1-12, XP002286278, Boston, MA.

Perkins, Charles E., "IP Mobility Support for IPv4", RFC-3344, Aug. 2002, Internet document at ftp://ftp.rfc-editor.org/in-notes/rfc3344.txt,(pp. 1-114).

Non-Final Office Action (dated Feb. 20, 2008), U.S. Appl. No. 10/723,916—Filing Date Nov. 25, 2003, First Named Inventor Ranjit S. Narjala, 16 pages.

Office Action for German Patent Application No. 11 2004 000 524.8, mailed Jun. 5, 2008, 7 Pages.

Office Action for Korean Patent Application 10-2005-7018168 mailed Apr. 21, 2008, 3 Pages.

* cited by examiner

| Scenario | NAI != Hostname | NAI == Hostname | Co-Located | Non-Colocated | Static Home Address Assignment |
|---|---|---|---|---|---|
| 1 | X | | X | | |
| 2 | X | | | X | |
| 3 | | X | X | | |
| 4 | | X | | X | |
| 5 | | | X | | X |
| 6 | | | | X | X |

FIG. 2

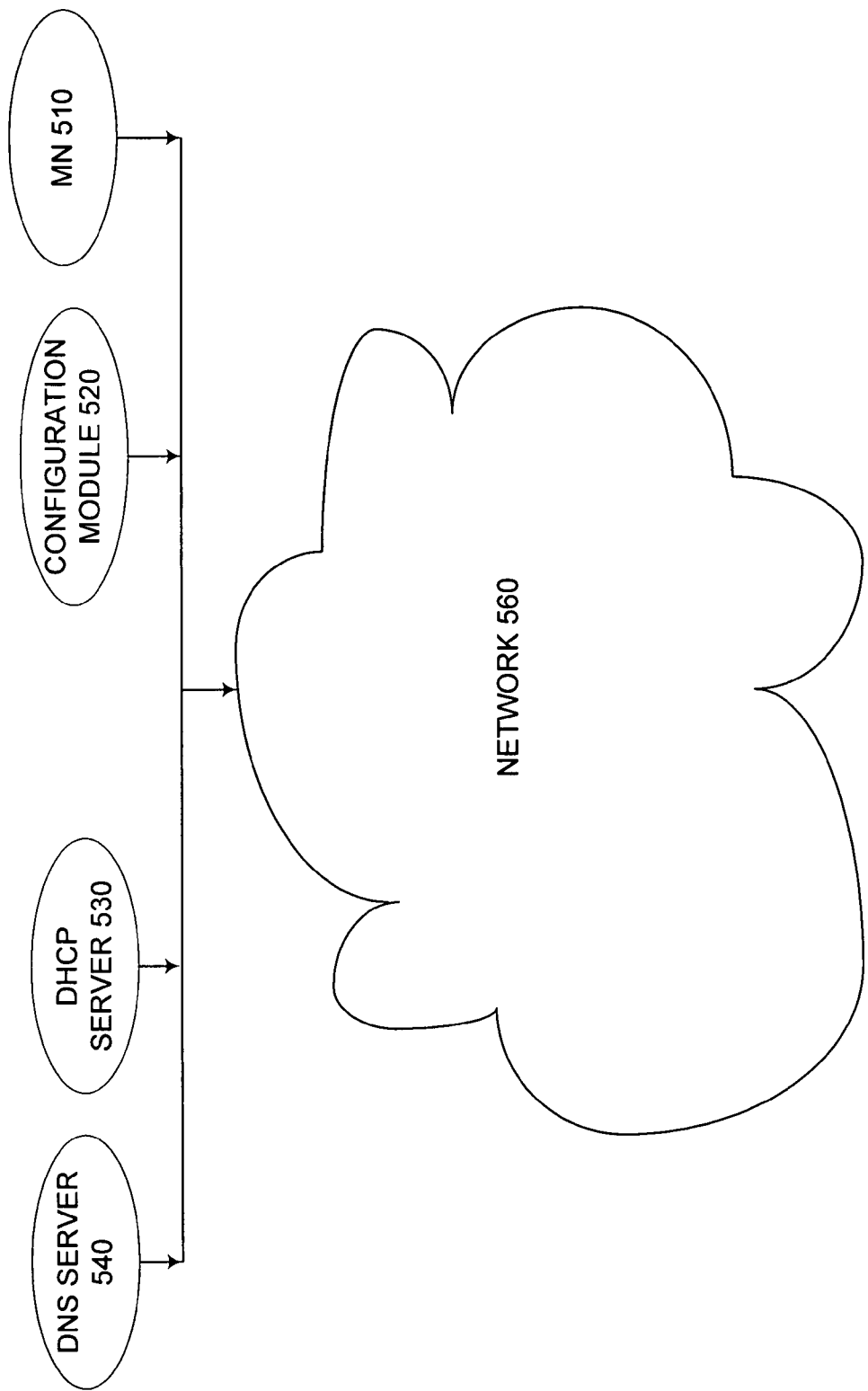

METHOD, APPARATUS AND SYSTEM FOR ENSURING RELIABLE ACCESS TO A ROAMING MOBILE NODE

FIELD OF THE INVENTION

The present invention relates to the field of mobile computing, and, more particularly to a method, apparatus and system for ensuring reliable access to a roaming mobile node.

BACKGROUND OF THE INVENTION

A hostname is a unique name by which a computing device may be identified on a network. Hostnames are used to simplify access to computing devices by enabling users to use unique names instead of addresses to access these devices. A hostname is typically translated into an Internet address by a Domain Name System (DNS) server.

Use of hostnames in mobile computing environments has introduced additional considerations. As mobile computing devices (hereafter mobile nodes) become increasingly popular, various protocols have been developed to address mobile computing requirements. For example, to enable mobile node users to move from one location to another (roam) while continuing to maintain their connectivity to the same network, the Internet Engineering Task Force (IETF) has promulgated roaming standards (Mobile IPv4, IETF RFC 3344, August 2002, hereafter Mobile IPv4, and Mobile IPv6, IETF Mobile IPv6, Internet Draft draft-ietf-mobileip-ipv6-19.txt. (Work In Progress), October 2002, hereafter Mobile IPv6).

Mobile IPv4 is currently the predominant standard, and many networks today are Mobile IPv4 compliant. Mobile IPv4 introduced the concept of Network Access Identifiers (NAIs). NAIs may be used in either Mobile IPv4 or Mobile IPv6 compliant networks to uniquely identify a mobile node. While a mobile node is typically identified by one hostname, it may also be associated with more than one NAI. Similar to hostnames, NAIs may also be translated into an Internet address by a DNS server.

BRIEF DESCRIPTION OF THE DRAWINGS

The present invention is illustrated by way of example and not limitation in the figures of the accompanying drawings in which like references indicate similar elements, and in which:

FIG. 2 is a table illustrating the various ways in which MN 140 may be configured;

FIG. 5 is a depiction of a system in one embodiment.

DETAILED DESCRIPTION

Embodiments of the present invention provide a method, apparatus and system for reliably accessing a roaming mobile node. Reference in the specification to one embodiment or an embodiment of the present invention means that a particular feature, structure or characteristic described in connection with the embodiment is included in at least one embodiment of the present invention. Thus, the phrases in one embodiment, according to one embodiment or the like appearing in various places throughout the specification are not necessarily all referring to the same embodiment.

Figure 1:
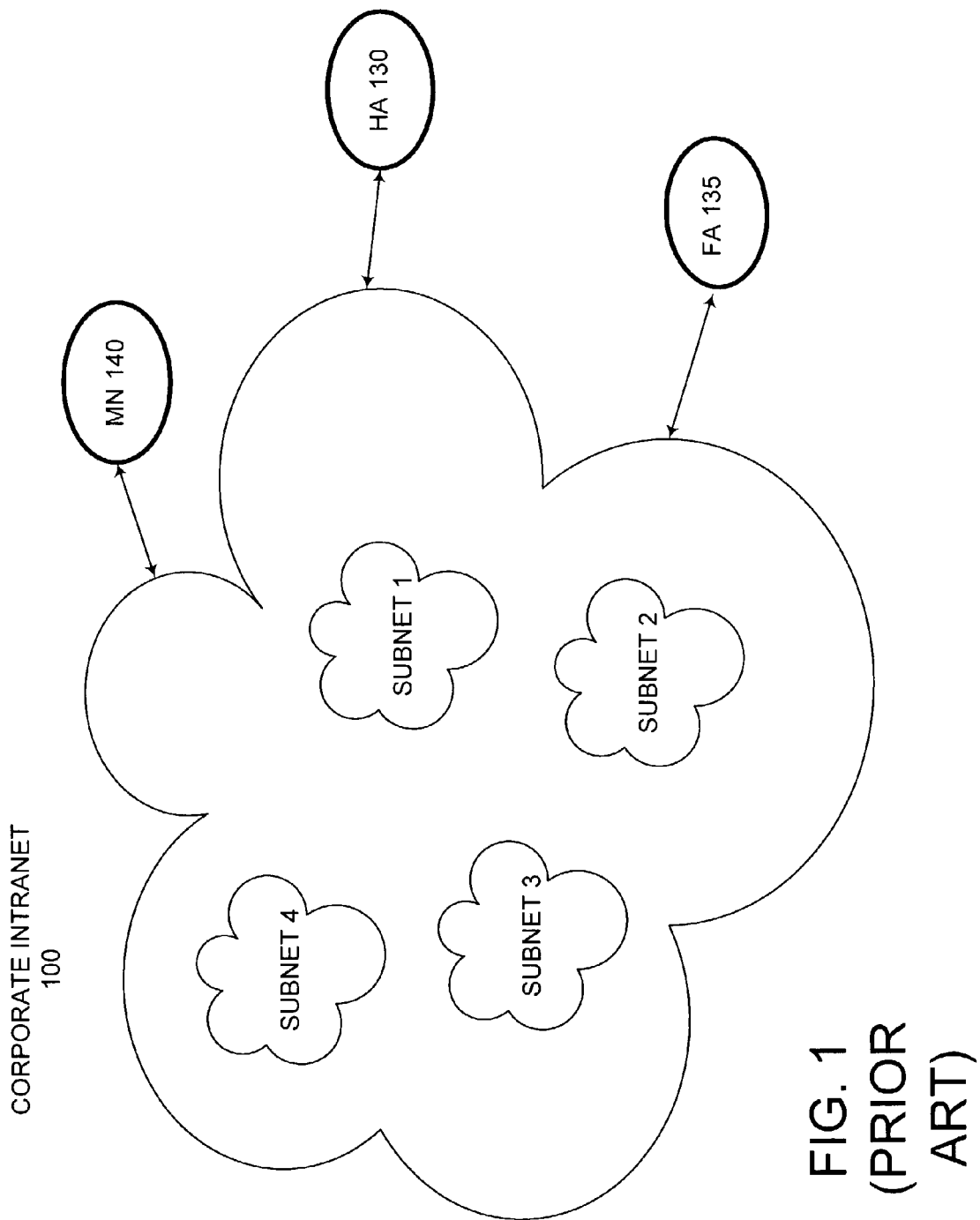
FIG. 1 illustrates a known corporate intranet structure today.

FIG. 1 illustrates a known corporate intranet (Corporate Intranet 100) structure. Corporate Intranet 100 may include both wired and wireless networks and may comprise multiple subnets. Subnets refer to portions of networks that may share the same common address format. For example, on a Transport Control Protocol/Internet Protocol (TCP/IP) network, all subnets may use the same first three sets of numbers (such as 100.10.10).

As previously described, a mobile node (hereafter MN 140) may have a hostname and a NAI associated with it. Mobile nodes that conform to Mobile IPv4 and/or Mobile IPv6 standards (hereafter collectively referred to as Mobile IP Standards) today may roam freely across subnets within Corporate Intranet 100. When MN 140 exits its home subnet, it may continue to maintain its current transport connections and constant reachability in one of two ways. In the first scenario, MN 140 may register with a home agent (HA 130) when it exits its home subnet. During the registration process, MN 140 informs HA 130 of MN 140 s care-of address (hereafter COA), namely MN 140 s address on its new subnet. HA 130 thereafter intercepts all IP packets addressed to MN 140 and reroutes the packets to MN 140 s COA. As MN 140 moves from one subnet to another, MN 140 may obtain new COAs via Dynamic Host Configuration Protocol (DHCP) or other similar protocols. To ensure that HA 130 is able to properly route packets to MN 140, MN 140 must continuously update HA 130 with its new COA as it roams on Corporate Intranet 100. This configuration is commonly referred to as a co-located communications mode.

Alternatively, in Mobile IPv4 compliant networks, when MN 140 leaves its home subnet, it may register with HA 130 via a foreign agent (FA 135) on MN 140 s new (foreign) subnet. By registering with FA 135, MN 140 may use FA 135 s IP address as its COA when registering with HA 130. In this scenario, HA 130 continues to intercept all packets addressed to MN 140, but these packets are now rerouted to FA 135, namely MN 140 s COA as provided to HA 130. FA 135 examines all packets it receives, and sends the appropriate ones to MN 140 at its current location on the foreign subnet. This configuration is commonly referred to as a non co-located communications mode. The decision of whether to use co-located or non co-located mode is well known to those of ordinary skill in the art. Certain networks may, for example, force MN 140 to register with FA 135 in order to maintain its transport connections. In other networks, MN 140 may have the option of registering with FA 135 or operating in a co-located mode.

In summary, when MN 140 is roaming across subnets, it may have associated with it: (i) a hostname; (ii) a NAI; (iii) an invariant home address; and (iv) a COA. As will be readily apparent to those of ordinary skill in the art, these multiple identifiers for MN 140 may cause inconsistencies as MN 140 roams. Details of these inconsistencies are described below.

FIG. 2 is a table illustrating the various ways in which MN 140 may be configured to conform to Mobile IPv4 standards. As illustrated, the mobile node may be configured according to one of six scenarios. In Scenario 1, MN 140 in a co-located mode may be assigned a NAI that is different from its hostname. When MN 140 obtains its COA (e.g., via DHCP or other similar protocols), a mapping entry may be created in a DNS server, mapping the COA to MN 140 s hostname {Hostname, COA}. This COA may change continuously as MN 140 roams across subnets. Additionally, MN 140 may be configured to obtain its home address through a NAI extension in its registration request to HA 130. HA 130 may issue a home address to MN 140 from HA 130 s IP address pool or by requesting the home address from a DHCP server via a DHCP (or other similar protocol) request. In the latter instance, in response to HA 130 s request, the DHCP server may issue MN 140 a home address and send the DNS server an update to create a mapping entry in the DNS server {NAI, MN_H}. As previously described, a correspondent node (CN) may attempt to reach MN 140 using its NAI and/or hostname. In Scenario 1 above, however, if CN tries to access MN 140 using MN 140 s hostname, instead of being resolved to MN 140 s home address, the hostname is resolved to MN 140 s COA. Since this communication is not routed via HA 130 that is responsible for maintaining MN 140 s mobile connectivity, MN 140 may not be reached reliably via its hostname.

In Scenario 2, Mobile Node 140 in a non co-located mode may be assigned a NAI that is different from its hostname. MN 140 may again be configured to obtain its home address through a NAI registration, resulting in a mapping entry in the DNS server {NAI, MN_H}. In this non co-located scenario, however, MN 140 may use FA 135 s address as its COA when registering with HA 130. Thus, unlike Scenario 1, MN 140 does not acquire a COA, which would result in a mapping between the hostname and the COA in the DNS server. As a result, there may not be a mapping entry at all for MN 140 s hostname in the DNS server, and CN may not reach MN 140 via its hostname. In addition, although this scenario does not trigger a mapping entry for MN 140 s hostname in the DNS Server, the DNS Server may nonetheless still include a stale entry in its binding table (e.g., MN 140 s hostname may still be mapped to an old COA from a previous configuration). In this situation, when CN that attempts to reach MN 140 via its hostname, the hostname will be resolved in the DNS Server to the stale COA, resulting in CN not being able to reach MN 140.

According to Scenario 3, MN 140 in a co-located mode may be assigned a NAI that is the same as its hostname. As described above in Scenario 1, the DNS server may include mappings for {NAI, MN_H} and {Hostname, COA}. In this situation, however, since the NAI and hostname are the same, the mapping in the DNS server may be unpredictable due to an IP address contention between MN 140 s hostname and NAI. The mappings may override each other, given the order in which the mappings are entered into the DNS server. As a result, access to MN 140 via either its hostname or NAI is likely to be unpredictable, at best.

In Scenario 4, MN 140 in a non co-located mode is assigned a NAI that is the same as its hostname. This scenario does not introduce any problems because, as described in Scenario 2 above, the NAI is mapped in the DNS server to MN 140 s invariant home address {NAI, MN_H}. In this situation, however, since the NAI is the same as the hostname, regardless of the fact there is no mapping for the hostname, MN 140 will nonetheless be reachable. In other words, a CN that attempts to reach MN 140 using its hostname will enter the same name as MN 140 s NAI, which will be resolved in the DNS server to MN_H.

In Scenario 5, MN 140 in a co-located mode may be assigned a static home address (e.g., by a corporate IT department), and a mapping may also be created in the DNS server {Hostname, MN_H}. As MN 140 roams and obtains a COA, however, a second entry may also be created in the DNS server {Hostname, COA}. The two mappings for MN 140 s hostname result in an IP address contention for the hostname. More specifically, the second mapping for hostname may overwrite the first, leaving the {Hostname, COA} mapping in the DNS server. As a result, as described in Scenario 1 above, MN 140 may no longer be reachable reliably using its hostname because the hostname may be mapped to MN 140 s COA.

In the final scenario, Scenario 6, MN 140 in a non co-located mode may be assigned a static home address, resulting in a mapping entry in the DNS server for {Hostname, MN_H}. As is readily apparent to those of ordinary skill in the art, this scenario presents no problems because, in a non co-located mode, no other mapping entry is created for MN 140 in the DNS server. CN may therefore reach MN 140 reliably via its hostname.

In summary, Scenarios 1, 2, 3 and 5 above result in various accessibility problems for MN 140 while it roams from subnet to subnet. Embodiments of the present invention resolve these problems by using a configured alternative name. More specifically, in embodiments of the invention, DHCP requests for COAs from MN 140 and replies to such requests are intercepted within MN 140 and replaced with configured alternative names and hostnames respectively. This eliminates a hostname mapping to COAs in the DNS server, thus eliminating the problems described above. This concept of using a configured alternative name is described in further detail below, in relation to FIG. 3.

Figure 3:
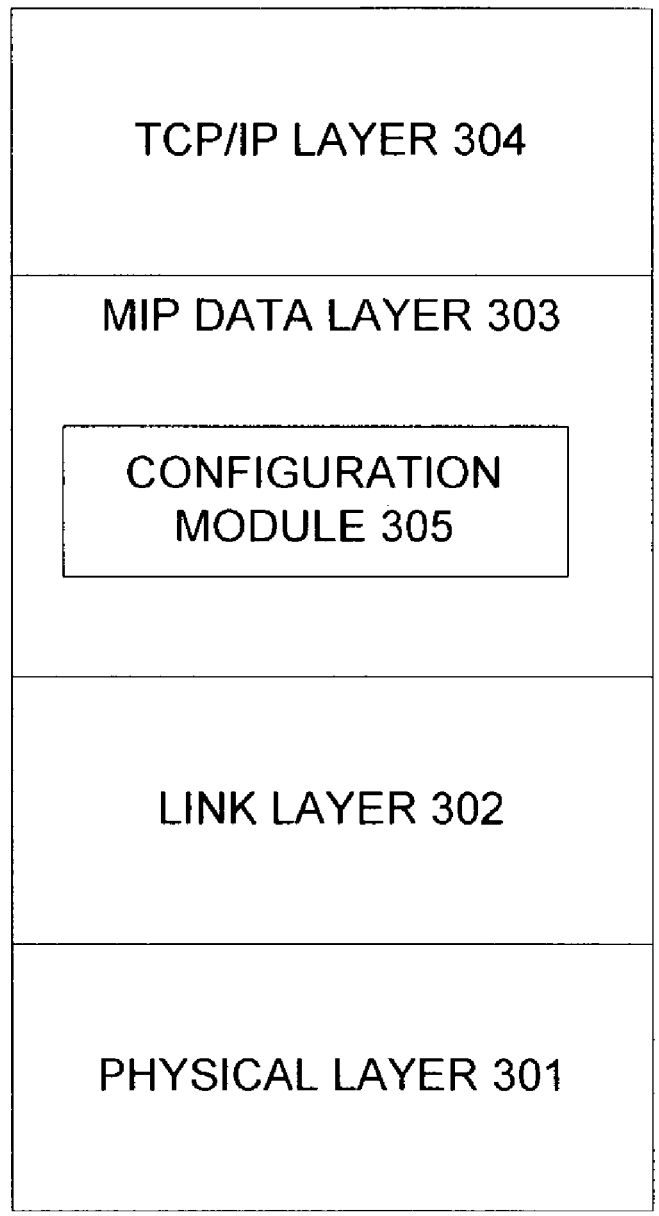
FIG. 3 illustrates a Mobile IP network stack according to embodiments of the present invention.

FIG. 3 illustrates a Mobile IP network stack on MN 140 according to embodiments of the present invention. The concepts of network stacks and passing messages up and down network stacks are well known to those of ordinary skill in the art and further description thereof is omitted herein in order not to unnecessarily obscure the present invention. As illustrated, the mobile IP layer (MIP Data Layer 303) intercepts DHCP requests that are sent by MN 140 to acquire a COA (hereafter referred to as COA Requests). Instead of directly routing the request down the network stack (i.e., to Link Layer 302 and Physical Layer 301), however, according to one embodiment of the present invention, Configuration Module 305 (illustrated conceptually as being contained within MIP Data Layer 303) may replace MN 140 s hostname in the COA request with a configured alternative name. This configured alternative name may then be passed down the network stack to Link Layer 302 and Physical Layer 301. In one embodiment, the COA request is a DHCP request and a DHCP server may process the request and send back a DHCP reply with a COA assignment (hereafter referred to as COA Reply). Upon receipt of this COA Reply, Configuration Module 305 may replace the configured alternative name in the reply with the actual hostname, and pass the COA Reply up the network stack, to TCP/IP Layer 304.

As will be readily apparent to those of ordinary skill in the art, by intercepting and modifying the COA Requests and COA Replies according to the embodiments described above, MN 140 s hostname may no longer be mapped to its COA in the DNS server. Therefore, in order to ensure that there is some mapping for MN 140 s hostname in the DNS server, in one embodiment of the present invention, a new registration request extension (Hostname Extension) may be used. Hostname Extension may be created per the guidelines specified in the Mobile IPv4 standard, and may be configured to inform HA 130 to request creation of a mapping entry between MN 140 s hostname and MN s home address in the DNS server {Hostname, MN_H}. In this manner, HA 130 may ensure that MN 140 s hostname is consistently mapped to MN 140 s home address in the DNS server. MN 140 s NAI continues to be mapped to MN 140 s home address {NAI, MN_H}. According to one embodiment of the present invention, these two mappings enable MN 140 to be reachable via both its hostname and NAI, regardless of whether the hostname and the NAI are the same.

Figure 4:
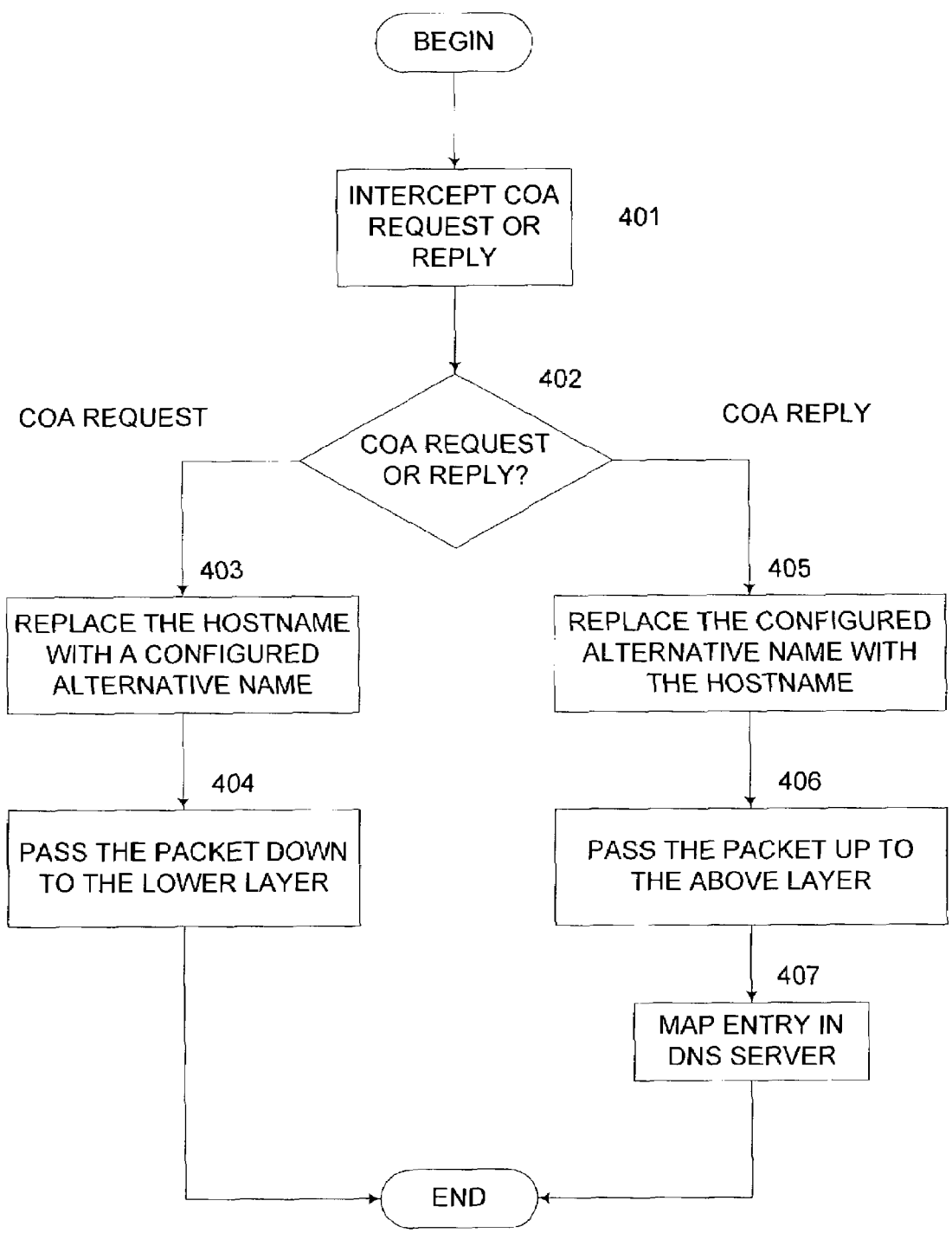
FIG. 4 is a flow chart illustrating an embodiment of the present invention.

FIG. 4 is a flow chart illustrating an embodiment of the present invention. Although the following operations may be described as a sequential process, many of the operations may in fact be performed in parallel or concurrently. In addition, the order of the operations may be re-arranged without departing from the spirit of embodiments of the invention. In 401, a COA Request or COA Reply may be intercepted. The request and/or reply may be examined in 402. In the case of a COA Request, the mobile node hostname in the request may be replaced by a configured alternative name in 403 and passed down the network stack in 404. Alternatively, in the case of a COA Reply, in 405 the configured alternative name may be replaced by the mobile node hostname and the reply may be passed up the network stack in 406. Additionally, at any point prior to, during or after these events, the mobile node s home agent may request creation of a mapping entry in the DNS server in 407, mapping the mobile node s hostname to the mobile node s home address.

FIG. 5 depicts a system in an embodiment. A network 560 interconnects a mobile node 510, a configuration module 520, a DHCP server, 530 and an DNS server 540, each interconnected to the network via a network link 550. The functionality of the DHCP server and DNS server are known in the art; and the mobile node and configuration module have functionality as described above.

The mobile nodes, home agents and foreign agents according to embodiments of the present invention may be implemented on a variety of data processing devices. It will be readily apparent to those of ordinary skill in the art that these data processing devices may include various software, and may comprise any devices capable of supporting mobile networks, including but not limited to mainframes, workstations, personal computers, laptops, portable handheld computers, PDAs and/or cellular telephones. In an embodiment, mobile nodes may comprise portable data processing systems such as laptops, handheld computing devices, personal digital assistants and/or cellular telephones. According to one embodiment, home agents and/or foreign agents may comprise data processing devices such as personal computers, workstations and/or mainframe computers. In alternate embodiments, home agents and foreign agents may also comprise portable data processing systems similar to those used to implement mobile nodes.

According to embodiment of the present invention, data processing devices may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus (USB) host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of embodiments of the invention, as set forth in the appended claims. The specification and drawings are, accordingly, to be regarded in an illustrative rather than a restrictive sense.

What is claimed is:

1. A method for ensuring reliable access to a mobile node, comprising:

intercepting a care of address ("COA") request, the COA request including a mobile node hostname;

routing the COA request to a configuration module within a network stack coupled to the mobile node;

the configuration module replacing the mobile node hostname in the COA request with an alternative configured name prior to passing the COA request with the alternative configured name to a physical layer within the network stack coupled to the mobile node;

transmitting the COA request with the alternative configured name to a server;

the configuration module on the mobile node intercepting a COA reply from the server, the COA reply being sent by the server in response to the COA request with the alternative configured name, the COA reply including the alternative configured name;

the configuration module replacing the alternative configured name with the mobile node hostname; and the configuration module transmitting the COA reply with the mobile node hostname up the network stack of the mobile node.

2. The method according to claim 1 further comprising transmitting a registration request to map an entry for the mobile node hostname and the mobile node home address in a Domain Name Services ("DNS") server.

3. The method according to claim 2 wherein transmitting the registration request comprises transmitting a Mobile IP registration request with a hostname extension.

4. The method according to claim 1 wherein the server comprises a dynamic host control protocol ("DHCP") server and the COA request includes a DHCP request.

5. A system for ensuring reliable access to a mobile node, comprising:

a mobile node capable of transmitting a care of address ("COA") request, the COA request including a mobile node hostname;

a configuration module within a network stack coupled to the mobile node, the configuration module capable of intercepting the COA request, the configuration module further capable of replacing the mobile node hostname in the COA request with an alternative configured name, the configuration module additionally capable of retransmitting the COA request with the alternative configured name to a network layer in the network stack coupled to the mobile node; and a server capable of receiving the COA request, the server is further capable of responding to the COA request with the alternative configured name, the server additionally capable of transmitting a COA reply to the mobile node wherein the COA reply includes the alternative configured name and wherein the configuration module on the mobile node is further capable of intercepting the COA reply and replacing the alternative configured name in the COA reply with the mobile node hostname, the configuration module additionally capable of transmitting the COA reply up the network stack coupled to the mobile node.

6. The system according to claim 5 further comprising a Domain Name Services ("DNS") server capable of mapping an entry for the mobile node hostname and the mobile node home address.

7. The system according to claim 5 wherein the server comprises a dynamic host control protocol ("DHCP") server, and the COA request comprises a DHCP request.

8. The system according to claim 5 wherein the configuration module resides within the network stack and the network stack is on the mobile device.

9. A system for ensuring reliable access to a mobile node, comprising:
a mobile node capable of transmitting a care of address ("COA") request, the COA request including a mobile node hostname; and
a configuration module in a network stack coupled to the mobile node, the configuration module capable of intercepting the COA request and replacing the mobile node hostname with an alternative configured name, the configuration module further capable of passing the COA request with the alternative configured name down the network stack to a physical layer, the COA request with the alternative configured name then being retransmitted to a server, wherein the configuration module is additionally capable of intercepting a COA reply from the server and wherein the COA reply includes the alternative configured name, the configuration module further capable of replacing the alternative configured name with the mobile node hostname, the configuration module additionally capable of transmitting the COA reply with the mobile node hostname up the network stack coupled to the mobile node.

10. The system according to claim 9 wherein the server comprises a dynamic host control protocol ("DHCP") server, and the COA request comprises a DHCP request.

11. The system according to claim 9 wherein the mobile node includes the configuration module.

12. An apparatus for ensuring reliable access to a mobile node, comprising:
a configuration module in a network stack capable of intercepting a care of address ("COA") request from the mobile node wherein the COA request includes a mobile node hostname, the configuration module further capable of replacing the mobile node hostname with an alternative configured name, the configuration module further capable of passing the COA request with the alternative configured name down the network stack to a physical layer to be retransmitted, wherein the configuration module is additionally capable of intercepting a COA reply, and wherein the COA reply includes the alternative configured name, the configuration module further capable of replacing the alternative configured name with the mobile node hostname, the configuration module additionally capable of retransmitting the COA reply with the mobile node hostname up the network stack coupled to the mobile node.

13. A tangible computer-readable medium having stored thereon instructions that, when executed by a machine, cause the machine to:
intercept a care of address ("COA") request, the COA request including a mobile node hostname;
route the COA request to a configuration module within a network stack on the mobile node;
replace the mobile node hostname in the COA request with an alternative configured name prior to passing the COA request with the alternative configured name from the configuration module to a physical layer within the network stack coupled to the mobile node;
transmit the COA request with the alternative configured name to a server;
intercept with the configuration module a COA reply from the server, the COA reply being sent by the server in response to the COA request with the alternative configured name, the COA reply including the alternative configured name;
replace by the configuration module the alternative configured name with the mobile node hostname; and
transmit the COA reply with the mobile node hostname from the configuration module up the network stack coupled to the mobile node.

14. The tangible computer-readable medium according to claim 13 wherein the instructions, when executed by the machine, further cause the machine to transmit a registration request to map an entry for the mobile node hostname and the mobile node home address in a Domain Name Services ("DNS") server.

15. The tangible computer-readable medium according to claim 14 wherein the instructions, when executed by the machine, further cause the machine to transmit a Mobile IP registration request with a hostname extension.

16. The article according to claim 13 wherein the server comprises a dynamic host control protocol ("DHCP") server and the COA request includes a DHCP request.

* * * * *